US011889332B2

(12) United States Patent
Gupta et al.

(10) Patent No.: US 11,889,332 B2
(45) Date of Patent: Jan. 30, 2024

(54) SYSTEM AND METHOD OF HIERARCHICAL COMPUTATION OF KPIS

(71) Applicant: Reliance Jio Infocomm Limited, Ahmedabad (IN)

(72) Inventors: Ajay Kumar Gupta, Pune (IN); Venkatraman Rajeshwari, Bengaluru (IN); Aayush Bhatnagar, Navi Mumbai (IN); Nitesh Sonalkar, Pune (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 309 days.

(21) Appl. No.: 17/390,195

(22) Filed: Jul. 30, 2021

(65) Prior Publication Data

US 2022/0038928 A1 Feb. 3, 2022

(30) Foreign Application Priority Data

Jul. 30, 2020 (IN) .............................. 202021032646

(51) Int. Cl.
*H04W 24/08* (2009.01)
(52) U.S. Cl.
CPC .................................. *H04W 24/08* (2013.01)
(58) Field of Classification Search
None
See application file for complete search history.

(56) References Cited

U.S. PATENT DOCUMENTS

| 11,381,463 | B2 * | 7/2022 | Yang | H04L 41/142 |
| 2014/0192970 | A1 * | 7/2014 | Castellani | G06Q 10/06375 |
| | | | | 379/265.06 |
| 2015/0379452 | A1 * | 12/2015 | Byrne | G06N 5/04 |
| | | | | 705/7.37 |
| 2016/0381580 | A1 * | 12/2016 | Kwan | H04L 41/5009 |
| | | | | 370/252 |
| 2017/0171871 | A1 * | 6/2017 | Ryan | H04L 41/5041 |

(Continued)

FOREIGN PATENT DOCUMENTS

| EP | 2600292 A1 * | 6/2013 | ....... G06Q 10/06398 |
| WO | WO-2016068926 A1 * | 5/2016 | ............. G06N 20/00 |
| WO | WO-2019099367 A1 * | 5/2019 | ............. F24F 11/63 |

*Primary Examiner* — Christopher T Wyllie
(74) *Attorney, Agent, or Firm* — FINNEGAN, HENDERSON, FARABOW, GARRETT & DUNNER, LLP.

(57) ABSTRACT

A system and method for hierarchical computation of KPI(s). The method encompasses receiving for at least one time slice, counter(s) associated with each node from one or more nodes. The method further encompasses defining at each time slice, metrics for said each node based on associated counter(s). The method thereafter comprises computing a locally aggregated value and a time aggregated value of the metrics. The method further encompasses mapping, the time aggregated value of each metric to a control center hierarchy (CCH). Further the method calculates a hierarchically aggregated value for each metric present in a target list of metrics associated with KPI expression(s) corresponding to said CCH, based on an aggregation of all time aggregated values of said each metric. The method thereafter encompasses computing, by a KPI scheduler unit, the KPI(s) for said CCH based at least on said hierarchically aggregated value and said KPI expression(s).

16 Claims, 5 Drawing Sheets

(56) References Cited

U.S. PATENT DOCUMENTS

| | | | | |
|---|---|---|---|---|
| 2019/0102719 A1* | 4/2019 | Singh | ............... | H04L 41/5032 |
| 2020/0118653 A1* | 4/2020 | Hagenbuch | ............ | G16H 40/20 |
| 2020/0234190 A1* | 7/2020 | Beaver | ............... | G06N 20/00 |
| 2021/0152455 A1* | 5/2021 | Castle | ............... | H04L 43/0876 |
| 2022/0038928 A1* | 2/2022 | Gupta | ............... | H04W 24/08 |

* cited by examiner

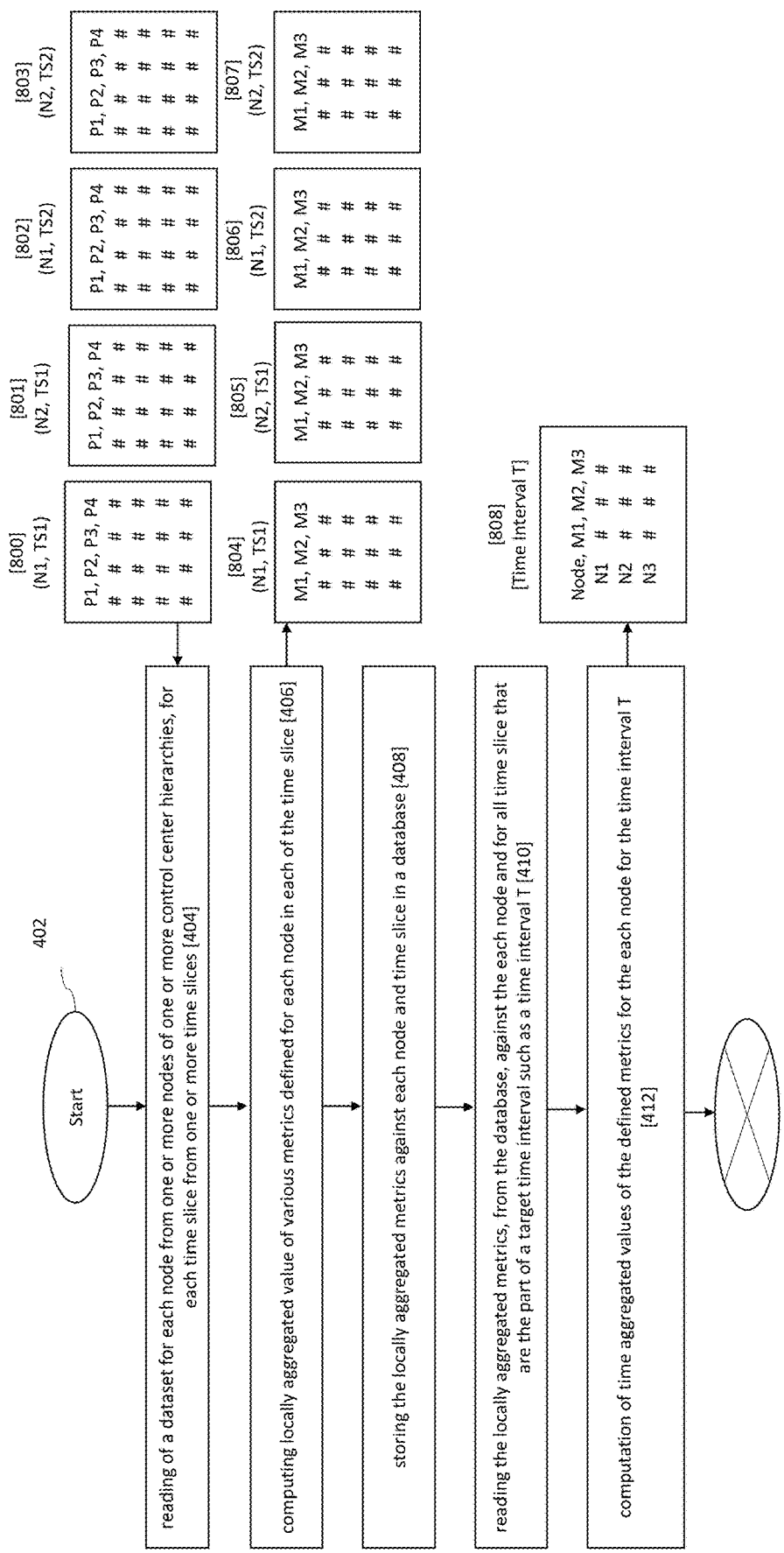
FIGURE 4 (4a)

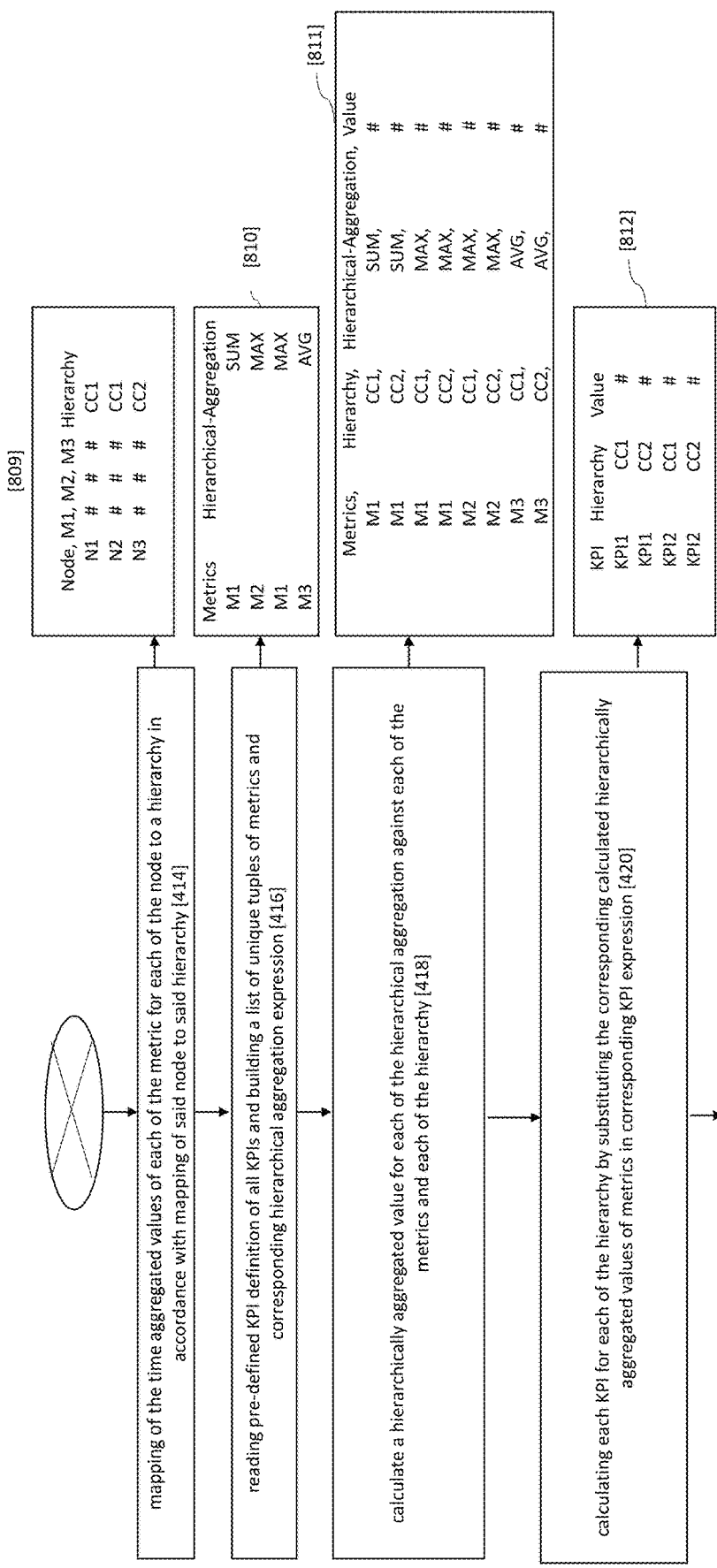
FIGURE 4 (4b)

SYSTEM AND METHOD OF HIERARCHICAL COMPUTATION OF KPIS

TECHNICAL FIELD

The present invention generally relates to Key Performance Indicator computation and more particularly to systems and methods for hierarchical computation of one or more Key Performance Indicators (KPIs) for a control center hierarchy in a telecom network, for a target time interval comprising of at least one time slice.

BACKGROUND OF THE DISCLOSURE

The following description of the related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as admissions of prior art.

At present a wireless network that is widely deployed to provide various communication services such as voice, video, data, content, advertisement, messaging, broadcasts etc. usually comprises multiple access networks and support communications for multiple users by sharing available network resources. One example of such a network is the Evolved Universal Terrestrial Radio Access (E-UTRA) which is a radio access network standard meant to be a replacement of the Universal Mobile Telecommunications System (UMTS) and High-Speed Downlink Packet Access/High-Speed Uplink Packet Access (HSDPA/HSUPA) technologies specified in 3GPP releases 5 and beyond. Unlike HSPA, Long Term Evolution's (LTE's) E-UTRA is an entirely new air interface system, unrelated to and incompatible with W-CDMA. It provides higher data rates, lower latency and is optimized for packet data. The earlier UMTS Terrestrial Radio Access Network (UTRAN) is the radio access network (RAN), defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High-Speed Packet Access (HSPA), which provides higher data transfer speeds and capacity to associated UMTS networks. Furthermore, as the demand for mobile data and voice access continues to increase, research and development continue to advance the technologies not only to meet the growing demand for access, but to advance and enhance the user experience with user device. Some of the technologies that have evolved starting GSM/EDGE, UMTS/HSPA, CDMA2000/EV-DO and TD-SCDMA radio interfaces with the 3GPP Release 8, e-UTRA is designed to provide a single evolution path for providing increases in data speeds, and spectral efficiency, and allowing the provision of more functionality.

Also, 3GPP has introduced Narrow Band Internet of things IoT (NB-IoT) technology in release 13. The low end IoT applications can be met with this technology. It has taken efforts to address IoT markets with completion of standardization on NB-IoT. The NB-IoT technology has been implemented in licensed bands. The licensed bands of LTE are used for exploiting this technology. This technology makes use of a minimum system bandwidth of 180 KHz i.e. one PRB (Physical Resource Block) is allocated for this technology. The NB-IOT can be seen as a separate RAT (Radio Access Technology). The NB-IOT can be deployed in 3 modes as: "in-band", "guard band" and "standalone". In the "in-band" operation, resource blocks present within LTE carrier are used. There are specific resource blocks reserved for synchronization of LTE signals which are not used for NB-IOT. In "guard band" operation, resource blocks between LTE carriers that are not utilized by any operator are used. In "standalone" operation, GSM frequencies are used, or possibly unused LTE bands are used. Release 13 contains important refinements like discontinuous reception (eDRX) and power save mode. The PSM (Power Save Mode) ensures battery longevity in release 12 and is completed by eDRX for devices that need to receive data more frequently.

Furthermore, one or more smart devices/user devices via the above disclosed and the like communication technologies provides one or more communication services to the users, wherein a 'smart computing device or user equipment (UE) or user device' refers to any electrical, electronic, electro-mechanical computing device or equipment or a combination of one or more of the above devices. Also, a 'smartphone' is one type of "smart computing device" that refers to mobility wireless cellular connectivity device that allows end users to use services on 2G, 3G, 4G, 5G and/or the like mobile broadband Internet connections with an advanced mobile operating system which combines features of a personal computer operating system with other features useful for mobile or handheld use. Also, the smartphone is an example of a smart mobility wireless cellular connectivity device that allows end users to use services on 2G, 3G, 4G, 5G and/or the like mobile broadband Internet connections with Wi-Fi, NFC, Bluetooth, Zigbee features etc. with the advanced mobile operating system which combines features of the personal computer operating system with other features useful for mobile or handheld use. Furthermore, in recent years, among the unlicensed wireless spectrum, the Wi-Fi technology based on IEEE 802.11 standards has seen a tremendous growth and commercialization. Almost all available UE (user equipment) with cellular capability support now possess Wi-Fi capability by default, in order to connect to Wi-Fi networks operating in either of the unlicensed frequency bands, 2.4 GHz or 5 GHz.

Furthermore, within a typical telecom network, there are multitude of wireless and wired nodes hosting one or more telecom functions. Further, some of these nodes are placed in a data centers to provide centralized services, while other are spread out in a geographical area to provide telecom coverage. All these nodes work together in cohesion to provide seamless and reliable telecom services to the users/customers on their smart computing device(s).

In order to detect potential problems hindering the seamless and reliable services provided to the users, a telecom service provider needs to have reliable monitoring on all these nodes hosting the one or more telecom functions. Most of the telecom service-providers/vendors depend on certain Key Performance Indicators (KPIs) related to one or more nodes or one or more group of nodes, to implement a monitoring mechanism at various hierarchical levels. Using monitored KPIs, a telecom service-provider/vendor can implement optimization routines on corresponding nodes in a hierarchy, estimate capacity requirements, prepare dashboards for business insights and capacity utilization, and proactively detect problems in functioning of said corresponding nodes. Also, each KPI is composed of one or more counters/parameters produced by a monitoring module of a node within a time slice and belongs to a certain hierarchy, wherein the hierarchy being composed of one or more similar or dis-similar nodes. Further, each KPI can be computed for multiple time intervals, such as quarterly, hourly, daily, weekly, monthly or a custom time range.

Also, as a typical telecom network consist of large number of nodes which in turn exposes several counters or parameters, there are large number of KPIs that needs to be computed at various hierarchy levels and time intervals. These computations therefore require efficient method and system which can compute the desired KPIs reliably and quickly with minimum use of resources. Mostly, the currently known computational solutions encompasses raw computational approaches which are not efficient. More particularly, in the current known solutions due to the absence of a modular computational approach, the hierarchical computation of various KPIs at various time intervals needs to be performed on corresponding raw counters/parameters available at nodes for various time slices within a time interval of KPI definition. This computation based on raw parameters can potentially become a massive computation task in the following scenarios:

When there are thousands of raw counters/parameters of interest are available in small time slices per node.

When there are millions of nodes on which KPI computation needs to be done.

When thousands of KPIs needs to be computed for each node.

When a KPI needs to be computed at multiple hierarchies at a hierarchical level.

Where a KPI needs to be computed for multiple hierarchical levels.

When a KPI needs to be computed at multiple time intervals.

Also, such a massive computation requires massive resources, and being on such a large scale, the computation remains unreliable at times. Furthermore, in order to deal with the problems related to computations of the KPIs some currently known solutions also provides a solution to present a service-monitoring dashboard using key performance indicators derived from machine data wherein one or more processing devices cause display of a service monitoring dashboard that includes one or more key performance indicator (KPI) widgets. These currently known solutions fails to provide any solution for modular computation for computing KPIs at various hierarchy levels and time intervals. Also, the currently known solutions are associated with many other scaling and reliability problems. Therefore, considering the scaling and reliability problems of the currently known solutions, limitations of the currently known raw computational approaches and such other limitations of the currently known solutions, it is required to build a modular approach to reliably and efficiently compute KPIs at a scale.

Therefore, there is a need in the art to provide a modular computational solution for providing an efficient and effective system and method for hierarchical computation of one or more Key Performance Indicators (KPIs) for a target time interval comprising of at least one time slice.

The foregoing examples of the related art and limitations related therewith are intended to be illustrative and not exclusive. Other limitations of the related art will become apparent to those of skill in the art upon a reading of the specification and a study of the figures.

SUMMARY OF THE DISCLOSURE

This section is provided to introduce certain objects and aspects of the present invention in a simplified form that are further described below in the detailed description. This summary is not intended to identify the key features or the scope of the claimed subject matter.

In order to overcome at least some of the drawbacks mentioned in the previous section and those otherwise known to persons skilled in the art, an object of the present disclosure is to provide a novel solution to provide a modular computational method and system for computing one or more KPIs at various hierarchy levels and time intervals. Another object of the present invention is to provide a method and system for hierarchical computation of one or more Key Performance Indicators (KPIs) of one or more control center hierarchies in a telecom network, for a target time interval comprising of at least one time slice. Also an object of the present disclosure is to define a metric at a time slice for each telecom node present in the one or more control center hierarchies based on one or more counters/parameters produced by said each telecom node's monitoring module at said time slice. Further an object of the present invention is to provide a local aggregation expression to aggregate one or more counters/parameters mapped to a metric, within a time slice for which a dataset comprising the one or more counters/parameters is received from a node. Also, an object of the present invention is to provide a time aggregation expression to aggregate locally aggregated values across multiple time slices encompassed in a target time interval such as a time interval T. Another object of the present disclosure is to provide a scalable, easy to use, seamless and efficient method to compute one or more KPIs to implement optimization routines on corresponding nodes in a hierarchy in order to further estimate capacity requirements, prepare dashboards for business insights and capacity utilization, and proactively detect problems in functioning of the nodes at various hierarchy levels and time intervals. Also, an object of the present disclosure is to provide an efficient and effective novel mechanism to compute hierarchical KPI(s) for a time interval as an expression of hierarchical aggregated metrics. Another object of the present disclosure is to provide a scalable method to manage and compute the hierarchical KPI(s). Further, an object of the present disclosure is to provide a novel method to compute desired KPI(s) reliably and quickly with minimum use of resources. Also, an object of the present disclosure is to provide service provided with features and ability to receive seamless KPIs computation services simultaneously or sequentially, consequently correct the desired parameters without any latency. Another object of the present disclosure is to provide features and ability to handle high volume of KPIs concurrently in a telecom ecosystem. Yet another object of the present invention is to provide mechanism to provide a seamless method to compute desired KPIs quickly of nodes/UEs independent of whether the nodes/UEs are 6G/5G/4G/3G/EV-Do/eH-RPD capable technology.

Furthermore, in order to achieve the aforementioned objectives, the present invention provides a method and system for hierarchical computation of one or more Key Performance Indicators (KPIs) for a target time interval comprising of at least one time slice.

A first aspect of the present invention relates to the method for hierarchical computation of one or more Key Performance Indicators (KPIs) for a target time interval comprising of at least one time slice. The method encompasses receiving, at a transceiver unit from one or more nodes present in one or more control center hierarchies of a telecom network, a dataset corresponding to the at least one time slice, wherein the dataset received from each node from the one or more nodes comprises one or more counters associated with said each node. The method further encompasses defining, by a processing unit at each time slice from the at least one time slice, one or more metrics for said each node based on one or more counters associated with said each node at said each time slice. The method thereafter comprises computing, by a local scheduler unit for said each time slice, a locally aggregated value of the one or more metrics defined for said each node. Further the method comprises computing, by a metric scheduler unit for the target time interval, a time aggregated value of the one or more metrics defined for said each node based on an aggregation of a locally aggregated value of the one or more metrics defined for said each node across all time slices present in the target time interval. The method further encompasses mapping, by the processing unit, the time aggregated value of each metric from the one or more metrics defined for said each node to a control center hierarchy corresponding to said each node. Further the method comprises calculating, by the processing unit, a hierarchically aggregated value, at least for each metric present in a target list of metrics associated with at least one KPI expression defined for one or more KPIs corresponding to said control center hierarchy, based on an aggregation of all time aggregated values of said each metric present in the target list of metrics in the target time interval across all nodes present in said control center hierarchy corresponding to said each node. The method thereafter encompasses computing, by a KPI scheduler unit, the one or more KPIs for said control center hierarchy corresponding to said each node based at least on the hierarchically aggregated value for said each metric present in the target list of metrics and the at least one KPI expression defined for the one or more Key Performance Indicators (KPIs) corresponding to said control center hierarchy.

Another aspect of the present invention relates to a system for hierarchical computation of one or more Key Performance Indicators (KPIs) for a target time interval comprising of at least one time slice. The system comprises a transceiver unit, configured to receive from one or more nodes present in one or more control center hierarchies of a telecom network, a dataset corresponding to the at least one time slice, wherein the dataset received from each node from the one or more nodes comprises one or more counters associated with said each node. The system further comprises a processing unit, configured to define at each time slice from the at least one time slice, one or more metrics for said each node based on one or more counters associated with said each node at said each time slice. Further the system comprises a local scheduler unit, configured to compute for said each time slice, a locally aggregated value of the one or more metrics defined for said each node. The system thereafter comprises a metric scheduler unit, configured to compute for the target time interval, a time aggregated value of the one or more metrics defined for said each node based on an aggregation of a locally aggregated value of the one or more metrics defined for said each node across all time slices present in the target time interval. Further, the processing unit is configured to map, the time aggregated value of each metric from the one or more metrics defined for said each node to a control center hierarchy corresponding to said each node. Also, the processing unit is further configured to calculate, a hierarchically aggregated value, at least for each metric present in a target list of metrics associated with at least one KPI expression defined for one or more KPIs corresponding to said control center hierarchy, based on an aggregation of all time aggregated values of said each metric present in the target list of metrics in the target time interval across all nodes present in said control center hierarchy corresponding to said each node. Further, the system comprises a KPI scheduler unit, configured to compute, the one or more KPIs for said control center hierarchy corresponding to said each node based at least on the hierarchically aggregated value for said each metric present in the target list of metrics and the at least one KPI expression defined for the one or more Key Performance Indicators (KPIs) corresponding to said control center hierarchy.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components, electronic components or circuitry commonly used to implement such components.

FIG. 4 (i.e. FIGS. 4a and 4b) illustrates an exemplary process depicting hierarchical computation of one or more Key Performance Indicators (KPIs) for a target time interval comprising of at least one time slice, in accordance with exemplary embodiments of the present invention.

Figure 1:
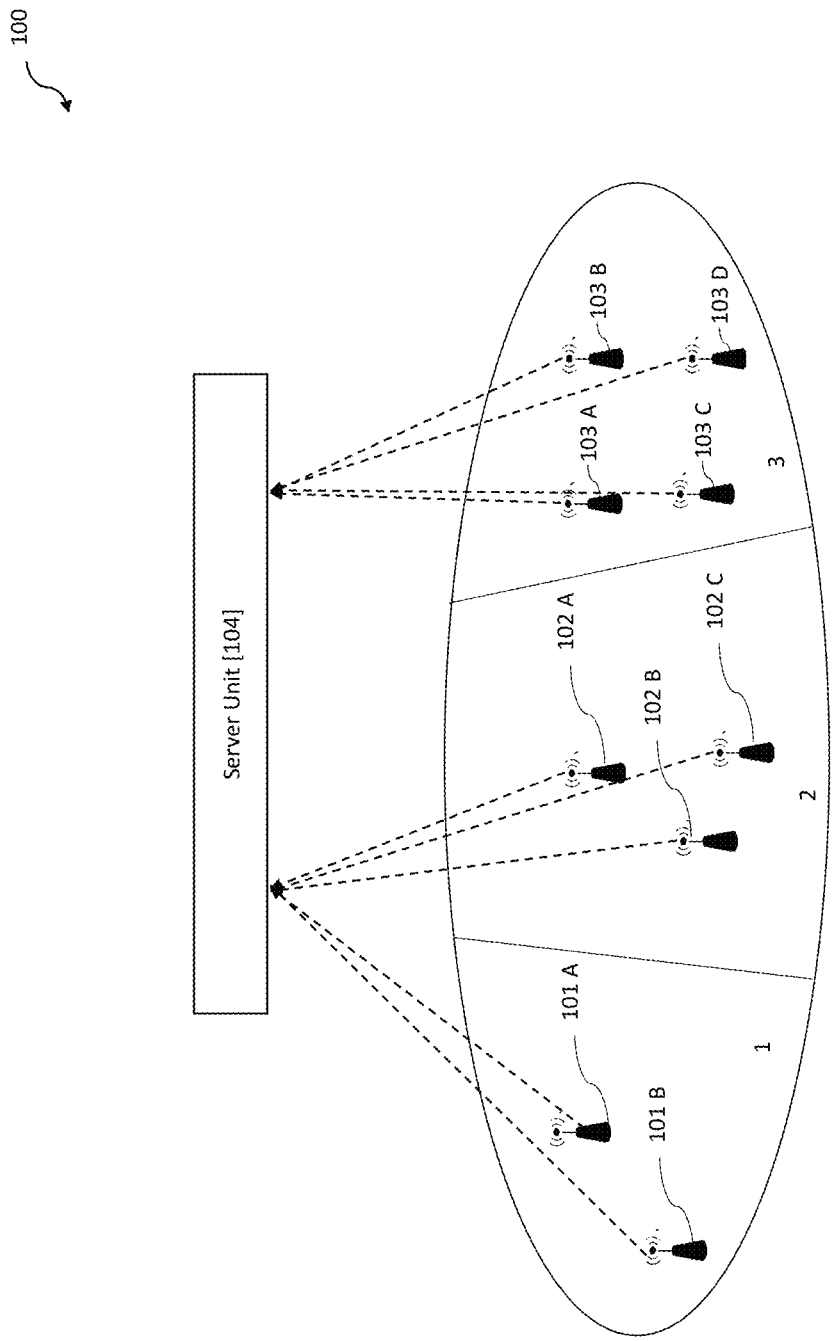
FIG. 1 illustrates an exemplary telecom network in accordance with exemplary embodiments of the present invention.

The foregoing shall be more apparent from the following more detailed description of the disclosure.

DESCRIPTION OF THE INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Also, it is noted that individual embodiments may be described as a process which is depicted as a flowchart, a flow diagram, a sequence diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The terms "first", "second", "primary" and "secondary" are used to distinguish one element, set, data, object, step, process, function, activity or thing from another, and are not used to designate relative position, or arrangement in time or relative importance, unless otherwise stated explicitly. The terms "coupled", "coupled to", and "coupled with" as used herein each mean a relationship between or among two or more devices, apparatus, files, circuits, elements, functions, operations, processes, programs, media, components, networks, systems, subsystems, and/or means, constituting any one or more of (a) a connection, whether direct or through one or more other devices, apparatus, files, circuits, elements, functions, operations, processes, programs, media, components, networks, systems, subsystems, or means, (b) a communications relationship, whether direct or through one or more other devices, apparatus, files, circuits, elements, functions, operations, processes, programs, media, components, networks, systems, subsystems, or means, and/or (c) a functional relationship in which the operation of any one or more devices, apparatus, files, circuits, elements, functions, operations, processes, programs, media, components, networks, systems, subsystems, or means depends, in whole or in part, on the operation of any one or more others thereof.

The terms "communicate," and "communicating" and as used herein include both conveying data from a source to a destination, and delivering data to a communications medium, system, channel, network, device, wire, cable, fiber, circuit and/or link to be conveyed to a destination and the term "communication" as used herein means data so conveyed or delivered. The term "communications" as used herein includes one or more of a communications medium, system, channel, network, device, wire, cable, fiber, circuit and link.

Moreover, terms like "user equipment" (UE), "electronic device", "mobile station", "user device", "mobile subscriber station," "access terminal," "terminal," "smartphone,"

"smart computing device," "smart device", "device", "handset," and similar terminology refers to any electrical, electronic, electro-mechanical equipment or a combination of one or more of the above devices. Smart computing devices may include, voice and non-voice capable devices such as including but not limited to, a mobile phone, smart phone, virtual reality (VR) devices, augmented reality (AR) devices, pager, laptop, a general-purpose computer, desktop, personal digital assistant, tablet computer, mainframe computer, smart set top box (STB), smart speaker, smart fitness band, smart watches, or any other computing device as may be obvious to a person skilled in the art and required to implement the features of the present invention. In general, a smart computing device is a digital, user configured, computer networked device that can operate autonomously. A smart computing device is one of the appropriate systems for storing data and other private/sensitive information. The said device may operate at all the seven levels of ISO reference model, but the primary function is related to the application layer along with the network, session and presentation layer with any additional features of a touch screen, apps ecosystem, physical and biometric security, etc. Further, a 'smartphone' is one type of "smart computing device" that refers to the mobility wireless cellular connectivity device that allows end-users to use services on 2G, 3G, 4G, 5G and/or the like mobile broadband Internet connections with an advanced mobile operating system which combines features of a personal computer operating system with other features useful for mobile or handheld use. These smartphones can access the Internet, have a touchscreen user interface, can run third-party apps including the capability of hosting online applications, music players and are camera phones possessing high-speed mobile broadband 4G LTE internet with video calling, hotspot functionality, motion sensors, mobile payment mechanisms and enhanced security features with alarm and alert in emergencies. Mobility devices may include smartphones, wearable devices, smartwatches, smart bands, wearable augmented devices, etc. For the sake of specificity, we will refer to the mobility device to both feature phone and smartphones in this disclosure but will not limit the scope of the disclosure and may extend to any mobility device in implementing the technical solutions. The above smart devices including the smartphone as well as the feature phone including IoT and the like devices enable the communication on the devices. Furthermore, the foregoing terms are utilized interchangeably in the subject specification and related drawings.

As used herein, a "processor" or "processing unit" includes one or more processors, wherein processor refers to any logic circuitry for processing instructions. A processor may be a general-purpose processor, a special-purpose processor, a conventional processor, a digital signal processor, a plurality of microprocessors, one or more microprocessors in association with a DSP core, a controller, a microcontroller, a low-end microcontroller, Application Specific Integrated Circuits, Field Programmable Gate Array circuits, any other type of integrated circuits, etc. Furthermore, the term "processor" as used herein includes, but is not limited to one or more computers, hardwired circuits, signal modifying devices and systems, devices and machines for controlling systems, central processing units, programmable devices and systems, systems on a chip, systems comprised of discrete elements and/or circuits, state machines, virtual machines, data processors, processing facilities and combinations of any of the foregoing. The processor may perform signal coding data processing, input/output processing, and/or any other functionality that enables the working of the system according to the present disclosure. More specifically, the processor or processing unit is a hardware processor. The term "processor" as used herein means processing devices, apparatus, programs, circuits, components, systems and subsystems, whether implemented in hardware, tangibly-embodied software or both, and whether or not programmable.

As used herein, "memory unit", "storage unit" and/or "memory" refers to a machine or computer-readable medium including any mechanism for storing information in a form readable by a computer or similar machine. For example, a computer-readable medium includes read-only memory ("ROM"), random access memory ("RAM"), magnetic disk storage media, optical storage media, flash memory devices or other types of machine-accessible storage media. The memory unit as used herein is configured to retain data, whether on a temporary or permanent basis, and to provide such retained data to various units to perform their respective functions.

As used herein the "Transceiver Unit" may include but not limited to a transmitter to transmit data to one or more destinations and a receiver to receive data from one or more sources. Further, the Transceiver Unit may include any other similar unit required to implement the features of the present invention. The transceiver unit may convert data or information to signals and vice versa for the purpose of transmitting and receiving respectively.

As disclosed in the background section the existing technologies have many limitations and in order to overcome at least some of the limitations of the prior known solutions, the present disclosure provides a novel automatic modular computational solution for computing one or more KPIs at various hierarchy levels and time intervals. More particularly, the present invention provides a solution for hierarchical computation of one or more Key Performance Indicators (KPIs) for one or more control center hierarchies, for a target time interval comprising of at least one time slice. The present invention in order to compute the one or more Key Performance Indicators (KPIs) for the one or more control center hierarchies (such as for one or more hierarchies of type 'H'), for the target time interval (such as for a time interval 'T') encompasses defining of one or more metrics at a node level. In an implementation a hierarchy of type 'H' represents a physical module consisting of one or more nodes, in one other implementation the hierarchy of type 'H' represents a logical relation comprising of one or more nodes and in yet another implementation the hierarchy of type 'H' represents a spatial relation comprising of one or more nodes within a given geographical boundary. Also, each metric from the one or more metrics (such as a metric 'M' having a unique global value and a domain and subdomain categorization) is mapped to at least one counter/parameter (such as 'C') received from each node (such as a node 'N') for which said each metric is defined. Further, said mapping of the each metric 'M' to the at least one counter/parameter 'C' received from the node for which said each metric is defined is done via a local aggregation expression (for instance: LAGG) defined for aggregating the mapped at least one counter/parameter 'C' within a time slice 'TS', and via a time aggregation expression (for instance: TAGG) defined for aggregating the locally aggregated value across multiple time slices falling in the time interval 'T' (i.e. the target time interval). Also, via the solution as disclosed by the present invention a hierarchical aggregation is done for the each metric (such as for the metric 'M') in accordance with a hierarchical expression (for instance: 'HAGG') specific to said each metric (such as the metric 'M'). Further, the present invention also encompasses defining a set of KPIs for the time interval 'T' at the one or more hierarchies of type 'H', wherein each KPI from the set of KPIs is associated with a KPI expression defined for said each KPI. The each KPI expression is comprises of one or more hierarchical aggregated metrics. In an implementation same KPI definition may be applied to multiple hierarchy types.

Further, the present invention encompasses computing the defined one or more metrics at the target time interval for said each node (such as the node 'N'), wherein the computing of the each metric (such as. the metric 'M') is done firstly by aggregating the mapped at least one counter/parameter (such as 'C') in accordance with the local aggregation expression (such as 'LAGG') for each of the time slice 'TS' in the time interval 'T' (i.e. the target time interval), and thereafter by aggregating locally aggregated values of the mapped at least one counter/parameter 'C' of all the time slices in the time interval 'T' in accordance with the time aggregation expression (such as 'TAGG'). Furthermore, in an instance the metric calculation at each time slice 'TS' is performed by a periodic schedule job running at some offset from an end of the corresponding time slice 'TS'. Also, in an implementation certain filters can be applied before performing local aggregation on at least one mapped counter values within a time slice while computing a metric for a node. Further, the present invention encompasses computing the one or more Key Performance Indicators (KPIs) for the one or more control center hierarchies (i.e. the one or more hierarchies of type 'H'), for instance at least by a computing a KPI for a hierarchy 'H1' from the one or more hierarchies of type 'H'. In an implementation one or more attributes of a node are used to assign said node to a certain hierarchy such as to the 'H1' of type 'H'. Further, the computation of the KPI for the hierarchy 'H1' is done firstly by hierarchically aggregating each metric from one or more metrics involved in a corresponding KPI expression of said KPI, wherein said hierarchical aggregation is done in accordance with a hierarchical expression (for instance: 'HAGG') corresponding to said each metric from the one or more metrics involved in the corresponding KPI expression and said hierarchical aggregation is done across metric values of all nodes that belong the hierarchy 'H1'. Further once a hierarchically aggregated value of the one or more metrics is determined for corresponding one or more Key Performance Indicators (KPIs) for the one or more control center hierarchies, the present invention thereafter encompasses substituting, in one or more corresponding KPI expressions of said one or more KPIs, the hierarchically aggregated value of the one or more metrics. After substitution, said one or more KPI expressions are evaluated to obtain the computed value of the corresponding one or more KPIs.

Therefore, the present invention provides a novel automatic modular computational solution for computing one or more KPIs at various hierarchy levels and time intervals. Also, the present invention provides a technical effect by providing a solution for hierarchical computation of one or more Key Performance Indicators (KPIs) for one or more control center hierarchies, for a target time interval comprising of at least one time slice. The present invention also provides a technical advancement over prior known solutions at least by at least one of reducing massive computations that requires massive resources, providing a more reliable solution, and providing a solution of modular computation of KPIs at various hierarchy levels and time intervals. Also, the present invention also provides a technical advancement over prior known solutions by eliminating the limitations of raw computational approaches.

Hereinafter, exemplary embodiments of the present disclosure will be described in detail with reference to the accompanying drawings so that those skilled in the art can easily carry out the present disclosure.

Referring to FIG. 1 an exemplary telecom network in accordance with exemplary embodiments of the present invention is shown. More particularly, FIG. 1 illustrates a telecom network depicting multiple radio access network (RAN) nodes (eNodeBs) i.e. 101A, 101B, 102A, 102B, 102C, 103A, 103B, 103C and 103D, wherein said multiple radio access network (RAN) nodes are spread out within a geographical area to provide a telecom coverage. Also, all the eNodeBs in FIG. 1 are arranged in a spatial hierarchy called as Control Center (CC) and three hierarchies of Control Centers namely 1 (i.e. CC1), 2 (i.e. CC2) and 3 (i.e. CC3) are depicted in FIG. 1, wherein CC1 consists of eNodeBs 101A and 101B, CC2 consists of eNodeBs 102A, 102B and 102C, and CC3 consists of eNodeBs 103A, 103B, 103C and 103D. Also, FIG. 1 depicts that all the eNodeBs are connected to a server unit [104] which collects one or more counters/parameters from each eNodeBs in real time or at periodic time intervals, and is configured to compute one or more KPIs at control central hierarchy level for hierarchies CC1, CC2 and CC3 according to one or more KPI definitions, wherein said computation of said one or more KPIs is based on a configuration of a system [200] at the server unit [104] in accordance with the implementation of the features of the present invention.

Figure 2:
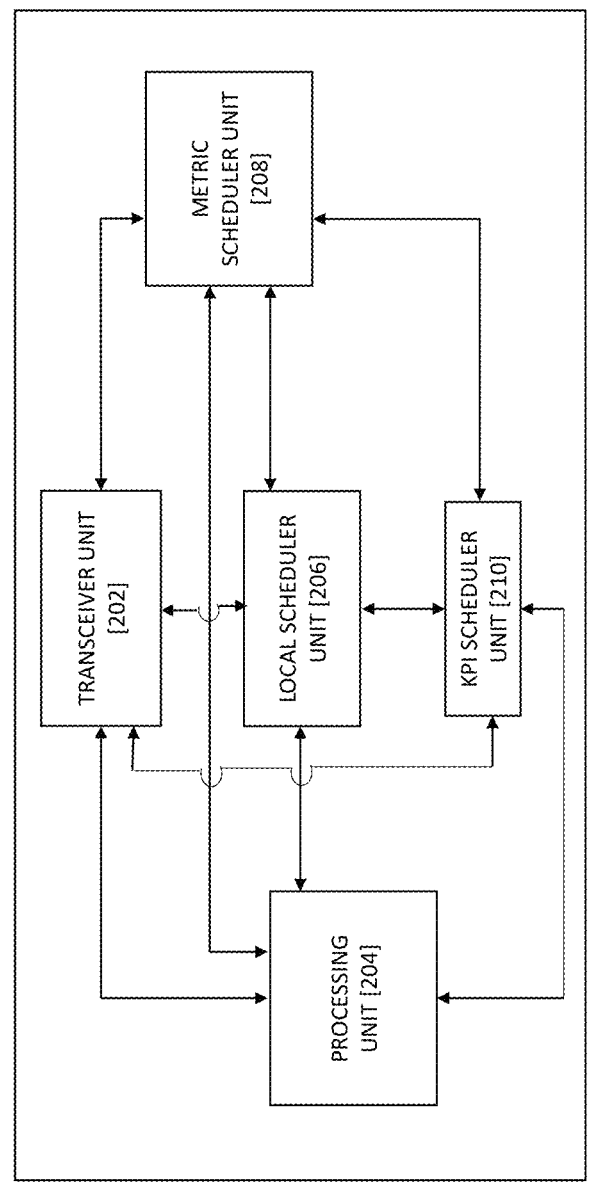
FIG. 2 illustrates an exemplary block diagram of a system [200] for hierarchical computation of one or more Key Performance Indicators (KPIs) for a target time interval comprising of at least one time slice, in accordance with exemplary embodiments of the present invention.

Referring to FIG. 2, an exemplary block diagram of a system [200] for hierarchical computation of one or more Key Performance Indicators (KPIs) for a target time interval comprising of at least one time slice is shown. The system [200] comprises at least one transceiver unit [202], at least one processing unit [204], at least one local scheduler unit [206], at least one metric scheduler unit [208], at least one KPI scheduler unit [210] and at least one storage unit (not indicated in FIG. 2). Also, all of the components/units of the system [200] are assumed to be connected to each other unless otherwise indicated below. Also, in FIG. 2 only a few units are shown, however, the system [200] may comprise multiple such units or the system [200] may comprise any such number of said units, as required to implement the features of the present disclosure. Further, in an implementation, the system [200] may be present in a server device to implement the features of the present invention.

The system [200] is configured to compute hierarchically one or more Key Performance Indicators (KPIs) for a target time interval comprising of at least one time slice, with the help of the interconnection between the components/units of the system [200].

The transceiver unit [202] of the system [200] is configured to receive from one or more nodes (such as from one or more eNodeBs) present in one or more control center hierarchies of a telecom network, a dataset corresponding to the at least one time slice, wherein the dataset received from each node from the one or more nodes comprises one or more counters associated with said each node. For example, the below provided Table 1 provides an exemplary dataset received from an eNodeB corresponding to a time slice 'TS', wherein said exemplary dataset consisting of 4 records against counters/parameters P1, P2, P3 and P4.

TABLE 1

| P1 | P2 | P3 | P4 |
|----|----|----|----|
| 1  | 2  | 3  | 4  |
| 10 | 20 | 30 | 40 |
| 2  | 4  | 8  | 16 |
| 4  | 9  | 32 | 40 |

Further, the transceiver unit [202] is configured to provide the dataset (i.e. the dataset received from the one or more nodes) corresponding to the at least one time slice to the processing unit [204]. The processing unit [204] is thereafter configured to define at each time slice from the at least one time slice, one or more metrics for said each node from the one or more nodes, based on one or more counters associated with said each node at said each time slice. Further, each metric from the one or more metrics defined for said each node is mapped to the one or more counters received from said each node and said each metric from the one or more metrics is associated with a corresponding local aggregation expression and a corresponding time aggregation expression. For example, Table 2 as provided below depicts exemplary metrics M1, M2, M3 and M4 defined for an eNodeB (i.e. node) from one or more eNodeBs (i.e. nodes), at each time slice TS based on a dataset received from said eNodeB, wherein each of the metric from the metrics M1, M2, M3 and M4 is mapped to a parameter/counter received from said eNodeB and has a Local aggregation expression and a Time aggregation expression defined against it. For example, Table 2 depicts that metric M1 defined for said eNodeB is mapped to parameter P1 present in the dataset received from said eNodeB, with base/local aggregation defined as SUM and time aggregation defined as MAX. Further Table 2 depicts that metric M2 defined for said eNodeB is mapped to parameter P2 present in the dataset received from said eNodeB, with base/local aggregation defined as MAX and time aggregation defined as MAX. Also, Table 2 depicts that metric M3 defined for said eNodeB is mapped to parameter P3 present in the dataset received from said eNodeB, with base/local aggregation defined as SUM and time aggregation defined as SUM. Furthermore, Table 2 also depicts that metric M4 defined for said eNodeB is mapped to parameter P4 present in the dataset received from said eNodeB, with base/local aggregation defined as AVG and time aggregation defined as MAX.

TABLE 2

| Metric | Parameter/Counter | Base/local Aggregation | Time Aggregation |
|--------|-------------------|------------------------|------------------|
| M1     | P1                | SUM                    | MAX              |
| M2     | P2                | MAX                    | MAX              |
| M3     | P3                | SUM                    | SUM              |
| M4     | P4                | AVG                    | MAX              |

Further, the processing unit [204] is configured to provide the one or more metrics defined at each time slice for said each node from the one or more nodes present in the one or more control center hierarchies, to the local scheduler unit [206]. The local scheduler unit [206] is thereafter configured to compute for said each time slice from the at least one time slice, a locally aggregated value of the one or more metrics defined for said each node at said each time slice. The locally aggregated value of the one or more metrics defined for said each node at said each time slice is computed based on an aggregation of the one or more mapped counters of said each metric from the one or more metrics in accordance with the corresponding local aggregation expression. For instance, for the metrics as disclosed in Table 2 i.e. for M1, M2, M3 and M4 defined for the eNodeB at each time slice TS, the local scheduler unit [206] is configured to compute, a locally aggregated value of M1, M2, M3 and M4 for said each time slice TS. Further the locally aggregated value of M1, M2, M3 and M4 is computed in accordance with corresponding local aggregation expression of each of the M1, M2, M3 and M4 (i.e. SUM, MAX, SUM and AVG respectively), by performing a local aggregation on multiple records of corresponding mapped parameters/counters (i.e. multiple records of P1, P2, P3 and P4 respectively for M1, M2, M3 and M4), wherein each record from said multiple records is present in the dataset received from the eNodeB for the time slice TS.

Further, once the locally aggregated value of the one or more metrics defined for said each node at said each time slice is computed, the processing unit [204] is configured to store the same at the storage unit. Therefore, the locally aggregated metric value for each of the node at each time slice is stored in a database i.e. in the storage unit.

The metric scheduler unit [208] is further configured to receive from the local scheduler unit [206] or the storage unit, the computed locally aggregated value of the one or more metrics defined for said each node at said each time slice, wherein said computation is done for said each time slice. Thereafter, the metric scheduler unit [208] is configured to compute for the target time interval, a time aggregated value of the one or more metrics defined for said each node based on an aggregation of a locally aggregated value of the one or more metrics defined for said each node across all time slices present in the target time interval. The time aggregated value of the one or more metrics defined for said each node is based on the corresponding time aggregation expression. Further, once the time aggregated value of the one or more metrics defined for said each node at said target time interval is computed, the processing unit [204] is configured to store the same at the storage unit. Therefore, the time aggregated metric value for said each node from the one or more nodes, at said target time interval, is also stored in the database i.e. in the storage unit. For example, for the metrics as disclosed in Table 2 i.e. for each of the metric M1, M2, M3 and M4 defined for the eNodeB, the metric scheduler unit [208] is configured to compute a time aggregated value for a target time interval (such as at time interval T), by firstly reading the corresponding node's i.e. the eNodeB's locally aggregated values corresponding to each of the metrics M1, M2, M3 and M4 against each of time slice which forms the part of time interval T. After the reading operation, for each metric aggregation of locally aggregated values of all the time slices in the time interval T is executed by the metric scheduler unit [208], in accordance with a time aggregation expression defined for said each metric, to arrive at a final metric value (i.e. the time aggregated value) for each of the defined metrics M1, M2, M3 and M4, which is again stored in a database against the corresponding node i.e. the eNodeB and the time interval T.

Thereafter, the processing unit [204] is configured to map, the time aggregated value of said each metric from the one or more metrics defined for said each node to a control center hierarchy corresponding to said each node. For example, if a time aggregated value for each of M1, M2 and M3 metric is computed for three eNodeB's A, B and C, respectively wherein each of the A, B and C is present in a control center hierarchy CC1, CC2 and CC3, respectively, the processing unit [204] in such scenario is further configured to map said time aggregated value computed for each of the M1, M2 and M3 metric to a corresponding control center hierarchy i.e. to CC1, CC2 and CC3, respectively.

Also, the processing unit [204] is further configured to define, for the target time interval, at least one KPI expression for one or more Key Performance Indicators (KPIs) corresponding to the one or more control center hierarchies, wherein each KPI expression associated with the one or more control center hierarchies comprises at least, one or more metrics associated with said one or more control center hierarchies. For instance, if two metrics M1 and M2 are defined for a node i.e. node A of a control center hierarchy i.e. CCH 1, the processing unit [204] in the given instant is configured to define, for a target time interval, at least one KPI expression for one or more Key Performance Indicators (KPIs) corresponding to the control center hierarchy CCH 1, wherein each KPI expression associated with the CCH 1 comprises at least, one or more metrics associated with the CCH 1 i.e. M1 and M2. For example, in the given instance for a target time interval T, a KPI expression for the one or more KPIs corresponding to the CCH 1 may be M1+M2. Also, the processing unit [204] is further configured to determine, a list of metrics and a hierarchical aggregation expression corresponding to each metric present in the list of metrics based on said at least one KPI expression defined for the one or more Key Performance Indicators (KPIs) corresponding to the one or more control center hierarchies. For example, in the above instance where for the target time interval T, the KPI expression for the one or more KPIs corresponding to the CCH 1 is defined as M1+M2, the processing unit [204] in the given instant is further configured to determine a list of metrics and a hierarchical aggregation expression corresponding to each metric present in the list of metrics based on said KPI expression M1+M2. Therefore, in the given instance the list of metrics comprises M1 and M2 and the hierarchical aggregation expression for the metric M1 may be AVG and the hierarchical aggregation expression for the metric M2 may be SUM.

Further, the processing unit [204] is configured to calculate, a hierarchically aggregated value, at least for each metric present in a target list of metrics associated with at least one KPI expression defined for one or more KPIs corresponding to said control center hierarchy, based on an aggregation of all time aggregated values of said each metric present in the target list of metrics in the target time interval across all nodes present in said control center hierarchy corresponding to said each node. The target list of metrics associated with the at least one KPI expression defined for the one or more KPIs corresponding to said control center hierarchy may be identified from the list of metrics determined based on the at least one KPI expression defined for the one or more Key Performance Indicators (KPIs) corresponding to the one or more control center hierarchies. Also, in an implementation the processing unit [204] is further configured to calculate a hierarchically aggregated value for said control center hierarchy corresponding to said each node based on the aggregation of all time aggregated values of said each metric present in the target list of metrics in the target time interval across all nodes present in said control center hierarchy. Furthermore, the aggregation of all time aggregated values of said each metric present in the target list of metrics in the target time interval across all nodes present in said control center hierarchy is done in accordance with a hierarchical aggregation expression corresponding to said each metric present in the target list of metrics associated with the at least one KPI expression defined for the one or more KPIs corresponding to said control center hierarchy. In an example, a list of metrics may be comprising of metrics M1 corresponding to a node 1 of a control center hierarchy CCH1, M2 corresponding to a node 2 of a control center hierarchy CCH2 and M3 and M4 corresponding to a node 3 of a control center hierarchy CCH3. Also, said list of metrics is determined based on a KPI expression defined for a Key Performance Indicator (KPI) corresponding to the control center hierarchies i.e. CCH1, CCH2 and CCH3. In the given instance, a target list of metrics associated with the KPI expression defined for the KPI corresponding to the control center hierarchy CCH3 may be identified from the list of metrics determined based on the KPI expression defined for the Key Performance Indicator (KPI) corresponding to the CCH1, CCH2 and CCH3 and in the given example the target list of metrics may comprise the metrics M3 and M4. Thereafter, the processing unit [204] is configured to calculate, a hierarchically aggregated value, at least for each metric (i.e. for each of the M3 and M4) present in the target list of metrics, based on an aggregation of all time aggregated values of each of the M3 and M4 in a target time interval across all nodes present in said control center hierarchy CCH3. Also, in the given example, in an implementation the processing unit [204] is further configured to calculate a hierarchically aggregated value for the control center hierarchy CCH3 based on the aggregation of all time aggregated values of each of the M3 and M4 in the target time interval across all nodes present in said control center hierarchy CCH3. Furthermore, the aggregation of all time aggregated values of each of the M3 and M4 in the target time interval across all nodes present in said control center hierarchy CCH3 is done in accordance with a hierarchical aggregation expression corresponding to each of the M3 and M4 present in the target list of metrics associated with the KPI expression defined for the KPI corresponding to said control center hierarchy CCH3.

Further, Table 3 as provided below depicts exemplary KPI expressions defined for exemplary KPIs for exemplary control center hierarchies at time interval T. Also, Table 3 depicts hierarchical aggregation expressions corresponding to metrics identified based on defined KPI expressions and a hierarchy type corresponding to each exemplary KPI:

TABLE 3

| KPI ID/<br>KPI Name | KPI<br>Expression | Hierarchical<br>Aggregation<br>Expression | Hierarchy<br>Type |
| --- | --- | --- | --- |
| KPI1 | M1 + M2 | M1: SUM,<br>M2: MAX | Control<br>Center |
| KPI2 | MAX (M3, M1) | M1: MAX,<br>M3: AVG | Control<br>Center |

Therefore, Table 3 provides definition of hierarchical KPIs for the time interval T at Control Center hierarchy level, wherein each KPI is based on a corresponding KPI expression of one or more hierarchically aggregated metrics at the Control Center hierarchy level in accordance with a hierarchical aggregation expression specified for each of the metric corresponding to each of the KPI expression. For instance, KPI expression for KPI1 is defined as addition of hierarchical aggregated values of metrics M1 and M2, M1 being hierarchical aggregated using SUM expression while M2 being hierarchical aggregated using MAX expression. Also, KPI expression for KPI2 is defined as MAX of hierarchical aggregated values of metrics M3 and M1, M1 being hierarchical aggregated using SUM expression while M3 being hierarchical aggregated using AVG expression.

Further, once the hierarchically aggregated value for said each metric present in the target list of metrics is calculated, the processing unit [204] is configured to provide the same to the KPI scheduler unit [210]. Thereafter, the KPI scheduler unit [210] is configured to compute, the one or more KPIs for said control center hierarchy corresponding to said each node based at least on the hierarchically aggregated value for said each metric present in the target list of metrics and the at least one KPI expression defined for the one or more Key Performance Indicators (KPIs) corresponding to said control center hierarchy. More particularly, the one or more KPIs for said control center hierarchy corresponding to said each node is computed based by substituting the hierarchically aggregated value for the metric(s) present in the target list of metrics in the corresponding at least one KPI expression defined for the one or more Key Performance Indicators (KPIs) corresponding to said control center hierarchy. In an example, in order to compute two KPIs, KPI1 and KPI2 at a time interval T for control center hierarchies CC1, CC2 and CC3, the KPI scheduler unit [210] is configured to evaluate one or more KPI expressions defined for one or more KPIs corresponding to the control center hierarchies CC1, CC2 and CC3 by substituting hierarchically aggregated metrics values into the one or more KPI expressions, wherein the hierarchically aggregated metrics values are determined based on an hierarchical aggregation of each metric according to a corresponding hierarchical aggregation expression.

Figure 3:
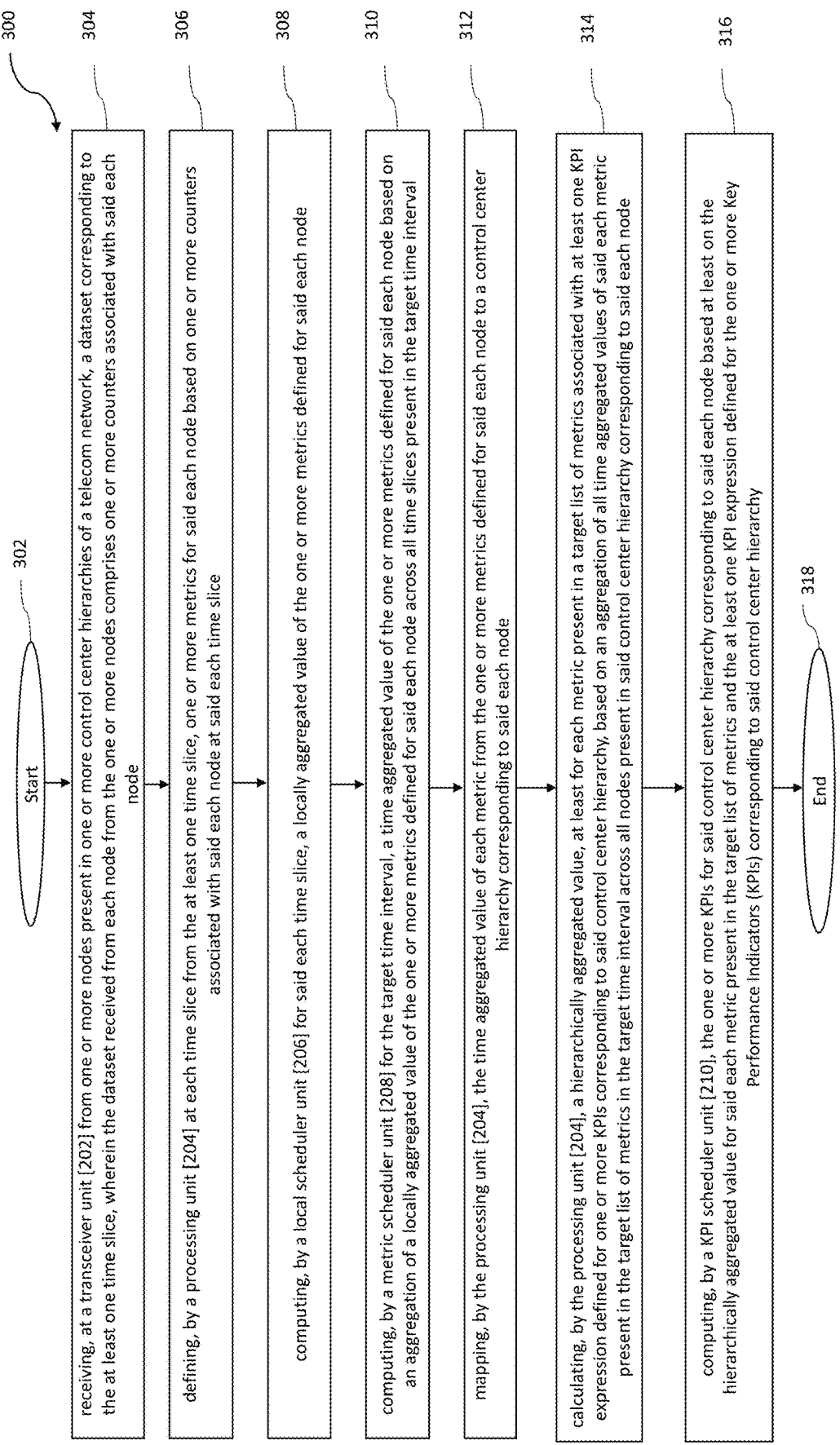
FIG. 3 illustrates an exemplary method flow diagram [300], for hierarchical computation of one or more Key Performance Indicators (KPIs) for a target time interval comprising of at least one time slice, in accordance with exemplary embodiments of the present invention.

Referring to FIG. 3 an exemplary method flow diagram [300], for hierarchical computation of one or more Key Performance Indicators (KPIs) for a target time interval comprising of at least one time slice, in accordance with exemplary embodiments of the present invention is shown. In an implementation the method is performed by the system [200]. Further, in an implementation, the system [200] may be present in a server device to implement the features of the present invention. Also, as shown in FIG. 3, the method starts at step [302].

At step [304] the method comprises receiving, at a transceiver unit [202] from one or more nodes present in one or more control center hierarchies of a telecom network, a dataset corresponding to the at least one time slice, wherein the dataset received from each node from the one or more nodes comprises one or For example, the below provided Table 4 provides an exemplary dataset received from an eNodeB corresponding to a time slice 'T', wherein said exemplary dataset consisting of 4 records against counters C1, C2, C3 and C4.

TABLE 4

| C1 | C2 | C3 | C4 |
|----|----|----|----|
| 10 | 20 | 30 | 40 |
| 1  | 2  | 3  | 4  |
| 20 | 40 | 80 | 60 |
| 40 | 90 | 30 | 50 |

Further, the method encompasses providing via the transceiver unit [202], the dataset (i.e. the dataset received from the one or more nodes) corresponding to the at least one time slice to a processing unit [204]. Next at step [306] the method comprises defining, by the processing unit [204] at each time slice from the at least one time slice, one or more metrics for said each node based on one or more counters associated with said each node at said each time slice. Also, each metric from the one or more metrics defined for said each node is mapped to the one or more counters received from said each node and said each metric from the one or more metrics is associated with a corresponding local aggregation expression and a corresponding time aggregation expression. For example, Table 5 as provided below depicts exemplary metrics M1, M2, M3 and M4 defined for an eNodeB from one or more eNodeBs, at each time slice T1 based on a dataset received from said eNodeB, wherein each of the metric from the metrics M1, M2, M3 and M4 is mapped to a counter received from said eNodeB and has a Local aggregation expression and a Time aggregation expression defined against it. For example, Table 5 depicts that metric M1 defined for said eNodeB is mapped to counter C1 present in the dataset received from said eNodeB, with base/local aggregation defined as MAX and time aggregation defined as SUM. Further Table 5 depicts that metric M2 defined for said eNodeB is mapped to counter C2 present in the dataset received from said eNodeB, with base/local aggregation defined as MAX and time aggregation defined as MAX. Also, Table 5 depicts that metric M3 defined for said eNodeB is mapped to counter C3 present in the dataset received from said eNodeB, with base/local aggregation defined as SUM and time aggregation defined as SUM. Furthermore, Table 5 also depicts that metric M4 defined for said eNodeB is mapped to counter C4 present in the dataset received from said eNodeB, with base/local aggregation defined as MAX and time aggregation defined as AVG.

TABLE 5

| Metric | Parameter/Counter | Base/local Aggregation | Time Aggregation |
|--------|-------------------|------------------------|------------------|
| M1 | C1 | MAX | SUM |
| M2 | C2 | MAX | MAX |
| M3 | C3 | SUM | SUM |
| M4 | C4 | MAX | AVG |

Further, the method encompasses providing by the processing unit [204], the one or more metrics defined at each time slice for said each node from the one or more nodes present in the one or more control center hierarchies, to a local scheduler unit [206]. Next, at step [308] the method comprises computing, by the local scheduler unit [206] for said each time slice, a locally aggregated value of the one or more metrics defined for said each node. Also, the locally aggregated value of the one or more metrics defined for said each node is computed based on an aggregation of the one or more mapped counters of said each metric from the one or more metrics in accordance with the corresponding local aggregation expression. For instance, for the metrics as disclosed in Table 5 i.e. for M1, M2, M3 and M4 defined for the eNodeB at each time slice T1, the method encompasses computing by the local scheduler unit [206], a locally aggregated value of M1, M2, M3 and M4 for said each time slice T1. Further the locally aggregated value of M1, M2, M3 and M4 is computed in accordance with corresponding local aggregation expression of each of the M1, M2, M3 and M4 (i.e. MAX, MAX, SUM and MAX respectively), by performing a local aggregation on multiple records of corresponding mapped parameters/counters (i.e. multiple records of C1, C2, C3 and C4 respectively for M1, M2, M3 and M4), wherein each record from said multiple records is present in the dataset received from the eNodeB for the time slice T1. Further, once the locally aggregated value of the one or more metrics defined for said each node at said each time slice is computed, the method comprises storing via the processing unit [204], said computed locally aggregated value at the storage unit. Therefore, the locally aggregated metric value for each of the node at each time slice is stored in a database i.e. in the storage unit.

The method thereafter comprises receiving at a metric scheduler unit [208] from the local scheduler unit [206] or the storage unit, the computed locally aggregated value of the one or more metrics defined for said each node at said each time slice, wherein said computation is done for said each time slice. Next, at step [310] the method comprises computing, by the metric scheduler unit [208] for the target time interval, a time aggregated value of the one or more metrics defined for said each node based on an aggregation of a locally aggregated value of the one or more metrics defined for said each node across all time slices present in the target time interval. The time aggregated value of the one or more metrics defined for said each node is based on the corresponding time aggregation expression.

Further, once the time aggregated value of the one or more metrics defined for said each node at said target time interval is computed, the method encompasses storing by the processing unit [204], said computed time aggregated value at the storage unit. Therefore, the time aggregated metric value for said each node from the one or more nodes, at said target time interval, is also stored in the database i.e. in the storage unit. For example, for the metrics as disclosed in Table 5 i.e. for each of the metric M1, M2, M3 and M4 defined for the eNodeB, the method encompasses computing via the metric scheduler unit [208], a time aggregated value for a target time interval (such as at time interval T), by firstly reading the corresponding eNodeB's locally aggregated values corresponding to each of the metrics M1, M2, M3 and M4 against each of time slice which forms the part of time interval T. After the reading operation, for each metric, aggregation of locally aggregated values of all the time slices in the time interval T is executed by the metric scheduler unit [208] in accordance with a time aggregation expression defined for said each metric, to arrive at a final metric value (i.e. the time aggregated value) for each of the defined metrics M1, M2, M3 and M4, which is again stored in a database against the corresponding eNodeB and the time interval T.

Thereafter, at step [312] the method comprises mapping, by the processing unit [204], the time aggregated value of each metric from the one or more metrics defined for said each node to a control center hierarchy corresponding to said each node. For example, if a time aggregated value for each of M1, M2 and M3 metric is computed for three eNodeB's B, C and D, respectively wherein each of the B, C and D is present in a control center hierarchy CC1, CC2 and CC3, respectively, the method in such scenario encompasses mapping by the processing unit [204] said time aggregated value computed for each of the M1, M2 and M3 metric to a corresponding control center hierarchy i.e. to CC1, CC2 and CC3, respectively.

Further, the method comprises defining, by the processing unit [204] for the target time interval, at least one KPI expression for one or more Key Performance Indicators (KPIs) corresponding to the one or more control center hierarchies, wherein each KPI expression associated with the one or more control center hierarchies comprises at least, one or more metrics associated with said one or more control center hierarchies. For instance, if two metrics M1 and M2 are defined for a node i.e. node 1 of a control center hierarchy i.e. CC1, the method in the given instant defines for a target time interval, via the processing unit [204], at least one KPI expression for one or more Key Performance Indicators (KPIs) corresponding to the control center hierarchy CC1, wherein each KPI expression associated with the CC1 comprises at least, one or more metrics associated with the CC1 i.e. M1 and M2. For example, in the given instance for a target time interval T, a KPI expression for the one or more KPIs corresponding to the CC1 may be MAX (M1, M2). Also, the method thereafter comprises determining, by the processing unit [204], a list of metrics and a hierarchical aggregation expression corresponding to each metric present in the list of metrics based on said at least one KPI expression defined for the one or more Key Performance Indicators (KPIs) corresponding to the one or more control center hierarchies. For example, in the above instance where for the target time interval T, the KPI expression for the one or more KPIs corresponding to the CC1 is defined as MAX (M1, M2), the method in the given instant encompasses determining by the processing unit [204], a list of metrics and a hierarchical aggregation expression corresponding to each metric present in the list of metrics based on said KPI expression MAX (M1, M2). Therefore, in the given instance the list of metrics comprises M1 and M2 and the hierarchical aggregation expression for the metric M1 may be SUM and the hierarchical aggregation expression for the metric M2 may be AVG.

Next, at step [314] the method comprises calculating, by the processing unit [204], a hierarchically aggregated value, at least for each metric present in a target list of metrics associated with at least one KPI expression defined for one or more KPIs corresponding to said control center hierarchy, based on an aggregation of all time aggregated values of said each metric present in the target list of metrics in the target time interval across all nodes present in said control center hierarchy corresponding to said each node. The target list of metrics associated with the at least one KPI expression defined for the one or more KPIs corresponding to said control center hierarchy may be identified from the list of metrics determined based on the at least one KPI expression defined for the one or more Key Performance Indicators (KPIs) corresponding to the one or more control center hierarchies. Also, in an implementation the method also encompasses calculating, by the processing unit [204], a hierarchically aggregated value for the control center hierarchy corresponding to said each node based on the aggregation of all time aggregated values of said each metric present in the target list of metrics in the target time interval across all nodes present in said control center hierarchy. Furthermore, the aggregation of all time aggregated values of said each metric present in the target list of metrics in the target time interval across all nodes present in said control center hierarchy is done in accordance with a hierarchical aggregation expression corresponding to said each metric present in the target list of metrics associated with the at least one KPI expression defined for the one or more KPIs corresponding to said control center hierarchy. In an example, a list of metrics may be comprising of metrics M1 corresponding to a node A of a control center hierarchy CC1, M2 corresponding to a node B of a control center hierarchy CC2 and M3 and M4 corresponding to a node C of a control center hierarchy CC3. Also, said list of metrics is determined based on a KPI expression defined for a Key Performance Indicator (KPI) corresponding to the control center hierarchies i.e. CC1, CC2 and CC3. In the given instance, a target list of metrics associated with the KPI expression defined for the KPI corresponding to the control center hierarchy CC3 may be identified from the list of metrics determined based on the KPI expression defined for the Key Performance Indicator (KPI) corresponding to the CC1, CC2 and CC3 and in the given example the target list of metrics may comprise the metrics M3 and M4. Thereafter, the method encompasses calculating by the processing unit [204], a hierarchically aggregated value, at least for each metric (i.e. for each of the M3 and M4) present in the target list of metrics, based on an aggregation of all time aggregated values of each of the M3 and M4 in a target time interval across all nodes present in said control center hierarchy CC3. Also, in the given example, in an implementation the method further comprises calculating by the processing unit [204] a hierarchically aggregated value for the control center hierarchy CC3 based on the aggregation of all time aggregated values of each of the M3 and M4 in the target time interval across all nodes present in said control center hierarchy CC3. Furthermore, the aggregation of all time aggregated values of each of the M3 and M4 in the target time interval across all nodes present in said control center hierarchy CC3 is done in accordance with a hierarchical aggregation expression corresponding to each of the M3 and M4 present in the target list of metrics associated with the KPI expression defined for the KPI corresponding to said control center hierarchy CC3.

Further, Table 6 as provided below depicts exemplary KPI expressions defined for exemplary KPIs for exemplary control center hierarchies at a time interval T. Also, Table 6 depicts hierarchical aggregation expressions corresponding to metrics identified based on defined KPI expressions and a hierarchy type corresponding to each exemplary KPI:

TABLE 6

| KPI ID/<br>KPI Name | KPI<br>Expression | Hierarchical<br>Aggregation<br>Expression | Hierarchy<br>Type |
| --- | --- | --- | --- |
| KPI1 | MAX (M1, M2) | M1: MAX,<br>M2: SUM | Control<br>Center |
| KPI2 | SUM M3 + M1 | M1: AVG,<br>M3: MAX | Control<br>Center |

Therefore, Table 6 provides definition of hierarchical KPIs for the time interval T at Control Center hierarchy level, wherein each KPI is based on a corresponding KPI expression of one or more hierarchically aggregated metrics in the Control Center hierarchy level in accordance with a hierarchical aggregation expression specified for each of the metric corresponding to each of the KPI expression. For instance, in Table 6 the KPI expression for KPI1 is defined as MAX of hierarchical aggregated values of metrics M1 and M2, M1 being hierarchical aggregated using MAX expression while M2 being hierarchical aggregated using SUM expression. Also, in Table 6 the KPI expression for KPI2 is defined as addition of hierarchical aggregated values of metrics M3 and M1, M1 being hierarchical aggregated using AVG expression while M3 being hierarchical aggregated using MAX expression.

Further, once the hierarchically aggregated value for said each metric present in the target list of metrics is calculated, the method encompasses providing the same via the processing unit [204] to a KPI scheduler unit [210]. Thereafter, at step [316] the method comprises computing, by the KPI scheduler unit [210], the one or more KPIs for said control center hierarchy corresponding to said each node based at least on the hierarchically aggregated value for said each metric present in the target list of metrics and the at least one KPI expression defined for the one or more Key Performance Indicators (KPIs) corresponding to said control center hierarchy. More particularly, the one or more KPIs for said control center hierarchy corresponding to said each node is computed based by substituting the hierarchically aggregated value of the metric(s) present in the target list of metrics in the corresponding at least one KPI expression defined for the one or more Key Performance Indicators (KPIs) corresponding to said control center hierarchy. In an example, in order to compute two KPIs, KPI1 and KPI2 at a time interval T1 for control center hierarchies CC1, CC2 and CC3, the method encompasses evaluating by the KPI scheduler unit [210], one or more KPI expressions defined for one or more KPIs corresponding to the control center hierarchies CC1, CC2 and CC3 by substituting hierarchically aggregated metrics values into the one or more KPI expressions, wherein the hierarchically aggregated metrics values are determined based on an hierarchical aggregation of each metric according to a corresponding hierarchical aggregation expression.

After hierarchical computation of the one or more Key Performance Indicators (KPIs) for the target time interval comprising of the at least one time slice, the method terminates at step [318].

Referring to FIG. 4 (i.e. FIGS. 4a and 4b), an exemplary process depicting hierarchical computation of one or more Key Performance Indicators (KPIs) for a target time interval comprising of at least one time slice, in accordance with exemplary embodiments of the present invention is shown. As shown in FIG. 4, the process/method starts at step [402].

Further at step [404], the exemplary process encompasses reading of a dataset for each node from one or more nodes (such as from two nodes N1 and N2) of one or more control center hierarchies, for each time slice from one or more time slices (such as for time slices TS1 and TS2). Also, in FIG. 4 at [800], [801], [802] and exemplary datasets received from the two nodes N1 and N2 for the time slice TS1 and TS2 are shown, wherein each dataset containing multiple records of parameters/counters P1, P2, P3 and P4 which are used to define metrics M1, M2 and M3 for each of the node N1 and N2.

Next at step [406], the exemplary process encompasses computing locally aggregated value of various metrics defined for each node in each of the time slice, wherein the local aggregation is done on one or more mapped parameters of each of the metric in accordance of local aggregation expression defined for each of the metric. Also, in FIGS. 4 at [804], [805], [806] and [807] exemplary computation of metrics M1, M2 and M3 defined for each of the node N1 and N2 in each of the time slice TS1 and TS2 is shown, wherein the local aggregation is done in accordance with local aggregation expression defined for M1, M2 and M3. In an example the local aggregation expression defined for the metrics M1, M2 and M3 may be as provided in the Table 2 disclosed above.

Further at step [408], the exemplary process encompasses storing the locally aggregated metrics against each node and time slice in a database.

Next at step [410], the exemplary process encompasses reading of the locally aggregated metrics, from the database, against the each node and for all time slice that are the part of a target time interval such as a time interval T.

Further at step [412], the exemplary process encompasses computation of time aggregated values of the defined metrics for the each node for the time interval T, wherein the time aggregation is done by aggregating the locally aggregated values of the defined metrics of the each node across all the time slices falling in the time interval T. Also, the aggregation is done in accordance with the time aggregation expression defined for each of the metric. Also, in FIG. 4 at [808] an exemplary calculation of metrics M1, M2 and M3 for each exemplary node N1, N2 and N3 in accordance with corresponding time aggregation expression is depicted.

Next at step [414], the exemplary process encompasses mapping of the time aggregated values of each of the metric for each of the node to a hierarchy in accordance with mapping of said node to said hierarchy. Also, in FIG. 4 at [809] an exemplary mapping of exemplary metrics M1, M2, M3 for each of the node from nodes N1, N2 and N3, to a control central (CC) hierarchy is shown, wherein the exemplary nodes N1 and N2 belongs to control central hierarchy CC1 and N3 belongs to control central hierarchy CC2.

Next at step [416], the exemplary process encompasses reading of pre-defined KPI definition of all KPIs and building a list of unique tuples of metrics and corresponding hierarchical aggregation expression. Also, in FIG. 4 at [810] an example of such an exemplary list built using exemplary KPI definition(s) is shown.

Next at step [418], the exemplary process describes iteration on the list built in step [416], wherein for each of the hierarchical aggregation expression against each of the metrics and each of the hierarchy, a hierarchically aggregated value is calculated by aggregating all time aggregated values of each of the metric in the time interval T across all nodes in corresponding hierarchy in accordance with a corresponding hierarchical expression of each of the metric. Also, in FIG. 4 at [811] an example of hierarchically calculated values of each of the exemplary metrics M1, M2 and M3 for each of the exemplary hierarchy CC1 and CC2 against each of the corresponding hierarchical aggregation depicted in [809] and [810] is shown.

Further at step [420], the exemplary process encompasses calculating each of KPI for each of the hierarchy by substituting the corresponding calculated hierarchically aggregated values of the metrics in corresponding KPI expression(s). Also, in FIG. 4 at [812] an example where KPIs, KPI1 and KPI2 are calculated for the hierarchies CC1 and CC2 by substituting the hierarchically aggregated value of the M1, M2 and M3 from [811] into corresponding KPI expression of KPI1 and KPI2 is shown. The exemplary process thereafter terminates at step [422].

Thus, the present invention provides a novel automatic modular computational solution for computing one or more KPIs at various hierarchy levels and time intervals. Furthermore, the present invention provides a solution that is scalable, easy to use, seamless and efficient to compute KPIs to implement optimization routines on corresponding nodes in a hierarchy to estimate capacity requirements, prepare dashboards for business insights, capacity utilization, and proactively detect problems in functioning of nodes at various hierarchy levels and time intervals. Also, the present invention provides a technical effect by providing a solution for hierarchical computation of one or more Key Performance Indicators (KPIs) for one or more control center hierarchies, for a target time interval comprising of at least one time slice. The present invention also provides a technical advancement over prior known solutions at least by at least one of reducing massive computations that requires massive resources, providing a more reliable solution, and providing a solution of modular computation of KPIs at various hierarchy levels and time intervals. Also, the present invention also provides a technical advancement over prior known solutions by eliminating the limitations of raw computational approaches.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

We claim:

1. A method for hierarchical computation of one or more Key Performance Indicators (KPIs) for a target time interval comprising of at least one time slice, the method comprising:
   receiving, at a transceiver unit from one or more nodes present in one or more control center hierarchies of a telecom network, a dataset corresponding to the at least one time slice, wherein the dataset received from each node from the one or more nodes comprises one or more counters associated with said each node;
   defining, by a processing unit at each time slice from the at least one time slice, one or more metrics for said each node based on one or more counters associated with said each node at said each time slice; computing, by a local scheduler unit for said each time slice, a locally aggregated value of the one or more metrics defined for said each node;
   computing, by a metric scheduler unit for the target time interval, a time aggregated value of the one or more metrics defined for said each node based on an aggregation of a locally aggregated value of the one or more metrics defined for said each node across all time slices present in the target time interval;
   mapping, by the processing unit, the time aggregated value of each metric from the one or more metrics defined for said each node to a control center hierarchy corresponding to said each node;
   calculating, by the processing unit, a hierarchically aggregated value, at least for each metric present in a target list of metrics associated with at least one KPI expression defined forone or more KPIs correspondingto said control center hierarchy, based on an aggregation of all time aggregated values of said each metric present in the target list of metrics in the target time interval across all nodes present in said control center hierarchy corresponding to said each node; and
   computing, by a KPI scheduler unit, the one or more KPIs for said control center hierarchy corresponding to said each node based at least on the hierarchically aggregated value for said each metric present in the target list of metrics and the at least one KPI expression defined for the one or more Key Performance Indicators (KPIs) corresponding to said control center hierarchy.

2. The method as claimed in claim 1, wherein each metric from the one or more metrics defined for said each node is mapped to the one or more counters received from said each node.

3. The method as claimed in claim 1, wherein each metric from the one or more metrics is associated with a corresponding local aggregation expression and a corresponding time aggregation expression.

4. The method as claimed in claim 3, wherein the locally aggregated value of the one or more metrics defined for said each node is computed based on an aggregation of the one or more mapped counters of said each metric from the one or more metrics in accordance with the corresponding local aggregation expression.

5. The method as claimed in claim 3, wherein the time aggregated value of the one or more metrics defined for said each node is further based on the corresponding time aggregation expression.

6. The method as claimed in 1, the method comprises:
defining, by the processing unit for the target time interval, at least one KPI expression for one or more Key Performance Indicators (KPIs) correspondingto the one or more control center hierarchies, wherein each KPI expression associated with the one or more control center hierarchies comprises at least, one or more metrics associated with said one or more control center hierarchies, and
determining, by the processing unit, a list of metrics and a hierarchical aggregation expression correspondingto each metric present in the list of metrics based on said at least one KPI expression defined forthe one or more Key Performance Indicators (KPIs) correspondingto the one or more control center hierarchies.

7. The method as claimed in 1, the method comprises calculating, by the processing unit, a hierarchically aggregated value forthe control center hierarchy correspondingto said each node based on the aggregation of all time aggregated values of each metric present in the target list of metrics in the target time interval across all nodes present in said control center hierarchy.

8. The method as claimed in 1, wherein the aggregation of all time aggregated values of said each metric present in the target list of metrics in the target time interval across all nodes present in said control center hierarchy is in accordance with a hierarchical aggregation expression corresponding to said each metric present in the target list of metrics associated with the at least one KPI expression defined for the one or more KPIs corresponding to said control center hierarchy.

9. A system for hierarchical computation of one or more Key Performance Indicators (KPIs) for a target time interval comprising of at least one time slice, the system comprising:
a transceiver unit, configured to receive from one or more nodes present in one or more control center hierarchies of a telecom network, a dataset corresponding to the at least one time slice, wherein the dataset received from each node from the one or more nodes comprises one or more counters associated with said each node;
a processing unit, configured to define at each time slice from the at least one time slice, one or more metrics for said each node based on one or more counters associated with said each node at said each time slice;
a local scheduler unit, configured to compute for said each time slice, a locally aggregated value of the one or more metrics defined for said each node;
a metric scheduler unit, configured to compute for the target time interval, a time aggregated value of the one or more metrics defined for said each node based on an aggregation of a locally aggregated value of the one or more metrics defined for said each node across all time slices present in the target tinne interval, wherein the processing unit is further configured to:
map, the time aggregated value of each metric from the one or more metrics defined for said each node to a control center hierarchy corresponding to said each node, and calculate, a hierarchically aggregated value, at least for each metric present in a target list of metrics associated with at least one KPI expression defined for one or more KPIs corresponding to said control center hierarchy, based on an aggregation of all time aggregated values of said each metric present in the target list of metrics in the target time interval across all nodes present in said control center hierarchy corresponding to said each node; and
a KPI scheduler unit, configured to compute, the one or more KPIs for said control center hierarchy corresponding to said each node based at least on the hierarchically aggregated value for said each metric present in the target list of metrics and the at least one KPI expression defined for the one or more Key Performance Indicators (KPIs) corresponding to said control center hierarchy.

10. The system as claimed in claim 9, wherein each metric from the one or more metrics defined for said each node is mapped to the one or more counters received from said each node.

11. The system as claimed in claim 9, wherein each metric from the one or more metrics is associated with a corresponding local aggregation expression and a corresponding time aggregation expression.

12. The system as claimed in claim 11, wherein the locally aggregated value of the one or more metrics defined for said each node is computed based on an aggregation of the one or more mapped counters of said each metric from the one or more metrics in accordance with the corresponding local aggregation expression.

13. The system as claimed in claim 11, wherein the time aggregated value of the one or more metrics defined for said each node is further based on the corresponding time aggregation expression.

14. The system as claimed in claim 9, wherein the processing unit is further configured to:
define, for the target time interval, at least one KPI expression for one or more Key Performance Indicators (KPIs) corresponding to the one or more control center hierarchies, wherein each KPI expression associated with the one or more control center hierarchies comprises at least, one or more metrics associated with said one or more control center hierarchies, and determine, a list of metrics and a hierarchical aggregation expression corresponding to each metric present in the list of metrics based on said at least one KPI expression defined for the one or more Key Performance Indicators (KPIs) corresponding to the one or more control center hierarchies.

15. The system as claimed in claim 9, wherein the processing unit is further configured to calculate a hierarchically aggregated value for the control center hierarchy corresponding to said each node based on the aggregation of all time aggregated values of each metric present in the target list of metrics in the target time interval across all nodes present in said control center hierarchy.

16. The system as claimed in claim 9, wherein the aggregation of all time aggregated values of said each metric present in the target list of metrics in the target time interval across all nodes present in said control center hierarchy is in accordance with a hierarchical aggregation expression corresponding to said each metric present in the target list of metrics associated with the at least one KPI expression defined for the one or more KPIs corresponding to said control center hierarchy.

* * * * *